United States Patent
Bertram et al.

(10) Patent No.: US 7,420,934 B2
(45) Date of Patent: Sep. 2, 2008

(54) SYSTEM AND METHOD FOR MAINTAINING NETWORK CONNECTIVITY DURING REMOTE CONFIGURATION OF AN INFORMATION HANDLING SYSTEM

(75) Inventors: Daniel Bertram, Cedar Park, TX (US); Yiqing Lai, Round Rock, TX (US); Paul Rad, Austin, TX (US); Weijia Zhang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 827 days.

(21) Appl. No.: 10/783,299

(22) Filed: Feb. 20, 2004

(65) Prior Publication Data

US 2005/0185589 A1 Aug. 25, 2005

(51) Int. Cl.
*H04L 12/28* (2006.01)
*G06F 155/177* (2006.01)

(52) U.S. Cl. ........................... 370/255; 709/221
(58) Field of Classification Search ................. 370/254, 370/255; 709/220–222, 227, 228, 226, 245
See application file for complete search history.

(56) References Cited

U.S. PATENT DOCUMENTS

| | | | |
|---|---|---|---|
| 6,144,992 A | 11/2000 | Turpin et al. | 709/208 |
| 6,345,294 B1* | 2/2002 | O'Toole et al. | 709/222 |
| 6,629,145 B1* | 9/2003 | Pham et al. | 709/230 |
| 7,103,648 B1* | 9/2006 | Burrows | 709/220 |
| 2002/0161867 A1* | 10/2002 | Cochran et al. | 709/221 |
| 2004/0133689 A1* | 7/2004 | Vasisht | 709/228 |
| 2005/0013255 A1* | 1/2005 | Knop et al. | 370/241 |

* cited by examiner

*Primary Examiner*—Seema S. Rao
*Assistant Examiner*—Christine Duong
(74) *Attorney, Agent, or Firm*—Hamilton & Terrile, LLP; Robert W. Holland

(57) ABSTRACT

A network connection of an information handling system is recovered after configuration of network communications components in an incorrect manner by adjusting the configuration of the network communication components. For instance, a network interface card (NIC) configured with an incorrect IP address has the IP addresses of other NICs of the information handling system applied to determine if network communication is supported. If application of each IP address fails to recover communication, the NIC adjusts to a dynamic network address, sends a configuration failure message, receives new configuration information and applies the new configuration information to establish network communication through a static network address.

16 Claims, 2 Drawing Sheets

SYSTEM AND METHOD FOR MAINTAINING NETWORK CONNECTIVITY DURING REMOTE CONFIGURATION OF AN INFORMATION HANDLING SYSTEM

BACKGROUND OF THE INVENTION

1. Field of the Invention

The present invention relates in general to the field of information handling system remote configuration, and more particularly to a system and method for maintaining network connectivity during remote configuration of an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often operated in a remote deployment environment in which a management station monitors and controls the software and firmware configuration of multiple clients. In a typical remote deployment, the information handling system is physically connected to a network through a network communication component, such as a network interface card (NIC), and then provided with power. A Pre-boot Execution Environment (PXE) client associated with the NIC initiates a boot to a PXE server to download a small program to deploy an operating system with a configuration agent. The configuration agent obtains configuration information from the management system and applies the configuration information to the information handling system. Generally, one of the first tasks for the configuration agent is to configure the NIC with Internet Protocol (IP) address information so that the management station can uniquely identify a NIC in the information handling system with a static IP address. Use of a static versus dynamic address helps to ensure accurate monitoring and configuring of the information handling system by the management station.

One difficulty that sometimes arises with remote deployment of a configuration is that an incorrect configuration of a NIC leads to failure of network communication to the information handling system and an inability to complete the configuration. Failure of a NIC configuration occurs if an IP address is not assigned or if an incorrect IP address is assigned, a not uncommon problem since IP and Media Access Control (MAC) addresses are generally a long series of letters or numbers that are prone to entry errors. Another cause of failure of a NIC configuration occurs if the operating system re-orders NICs of an information handling system from the order provided by the configuration agent. There is no standard way to order multiple NICs in an information handling system. Different operating systems and utilities might list NICS in different order, which in some cases results in configuration assigned to NIC 0 being actually assigned to NIC 1. Whatever the cause, once an incorrect configuration is applied to the NIC interfaced with the network, communication by the static address supported by the NIC typically fails until a technician manually and locally configures the system to recover network communication.

SUMMARY OF THE INVENTION

Therefore a need has arisen for a system and method which maintains or recovers network connectivity during a remote configuration deployment in the event of incorrect configuration of network communication components.

In accordance with the present invention, a system and method are provided which substantially reduce the disadvantages and problems associated with previous methods and systems for maintaining or recovering network connectivity. Information handling system network communication component configuration followed by failed network connectivity results in automatic adjustment of the configuration information to re-establish network communication.

More specifically, a configuration agent applies configuration information to network communication components of an information handling system, such as IP address information applied to NICs. A management connection engine tests communication of the configured network communication component by sending a message to a remote deployment management station and checking for a response. If the network connectivity has failed, a configuration adjustment engine adjusts the network communication component configuration to re-establish network connectivity. The configuration adjustment engine attempts to establish static address connectivity by applying configuration information for each network communication component to the component interfaced with the network. For instance, where plural NICs are configured in an information handling system, each IP address for each NIC is applied to the NIC interfaced with the network to determine if a network connection is re-established. If the configuration information of the alternative network communication components fails to re-establish communication by a static address, the configuration adjustment engine re-establishes network connectivity by a dynamic address so that correct configuration information may be sent through the network to the information handling system.

The present invention provides a number of important technical advantages. One example of an important technical advantage is that network connectivity between a management station and an information handling system is maintained in the event of incorrect configuration without manual and local reconfiguration of the information handling system. The configuration adjustment engine provides for re-ordering of NICs to support a static address that allows continued deployment of a configuration to information handling system or re-establishes communication through a dynamic address that allows re-configuration of NICs. Automatic re-establishment of network connectivity improves factory work flow in a remote deployment environment for reduced operational expense and greater manufacturing efficiency.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Network connectivity is maintained for an information handling system during remote configuration by adjusting an incorrect configuration at the information handling system to find a correct configuration. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
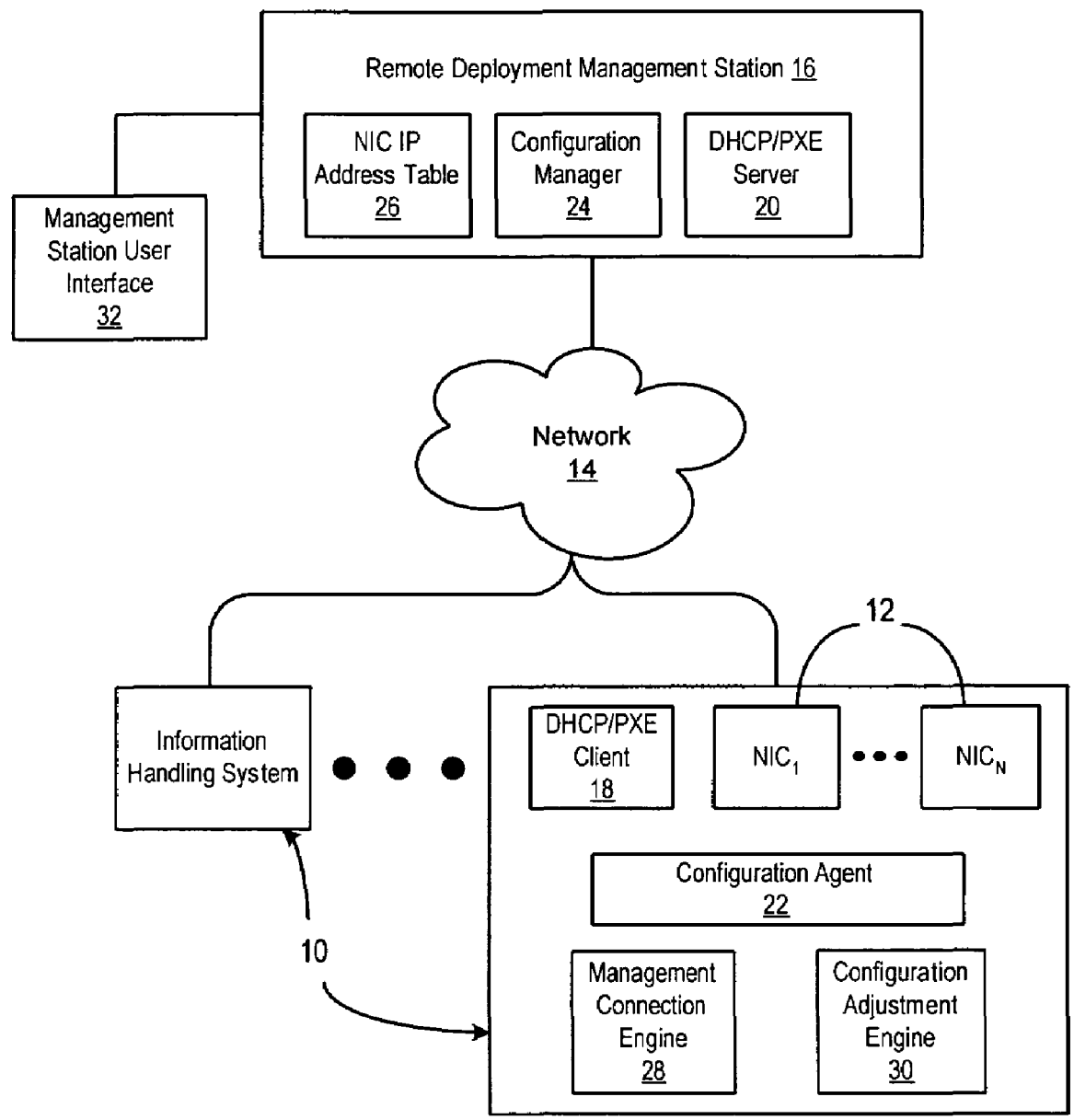
FIG. 1 depicts a block diagram of a system for maintaining network connectivity during remote configuration of network communication components.

Referring now to FIG. 1, a block diagram depicts a system for maintaining network connectivity during remote configuration of network communication components of information handling systems 10. Information handling system 10 has one or more NICs 12 that interface through a network 14 to communicate with a remote deployment management station 16. For instance, on initial power up of information handling system 10, a PXE client 18 associated with a NIC 12 establishes communication with a Dynamic Host Configuration Protocol (DHCP)/PXE server 20 through a dynamically assigned Internet address. PXE server 20 downloads a small program that deploys an operating system with a configuration agent 22, which obtains configuration information for information handling system 10 from a configuration manager 24. Configuration agent 22 configures information handling system 10 with desired software and firmware through a static Internet address that ensures correct downloads to a selected information handling system where plural systems interface with network 14.

In order to support communication over network 14 at a static address, configuration manager 24 provides the IP addresses for NICs 12 from NIC IP address table 26 for loading by configuration agent 22. In the event of an incorrect configuration of NICs 12 with the IP addresses, failure of network communications occurs. For instance, failed network communications will occur if an erroneous IP address is sent for a NIC 12, if an IP address is not sent to an intended NIC or if the operating system alters the assigned NIC number. A management connection engine 28 checks network communication by sending a message to configuration manager 24 and receiving a response that confirms network communication at the static address. If management connection engine 28 determines a failure of the network communication, then configuration adjustment engine 30 determines an adjusted configuration and adjusts the NIC configuration through configuration agent 22. After each configuration adjustment, management connection engine 28 re-attempts network communication until a response is received from configuration manager 24 so that a definitive configuration may be set.

Configuration adjustment engine 30 adjusts the configuration by first assuming that NICs 12 were incorrectly assigned operating system numbers, such as due to re-ordering by the operating system. Configuration adjustment engine 30 adjusts the configuration by attempting each IP address for each NIC 12 on the NIC 12 that is selected for communication over network 14. If network communication is re-established by an adjusted IP address, configuration agent 22 adopts the appropriate IP address for each NIC 12 and continues with configuration of information handling system 10. If none of the IP addresses re-establish network communication, then configuration adjustment engine 30 assumes that an incorrect or unassigned IP address has caused failure of the network communication and a switch to use of a dynamic address is made. Although communication by a dynamic address does not support remote configuration of plural information handling systems, it does allow a message to be sent to configuration manager 24 that a configuration error has occurred. Configuration manager 24 obtains new configuration information from a management station user interface 32 and provides the new configuration information to configuration agent 22 to reattempt configuration of NICs 12 for support of a static address.

Figure 2:
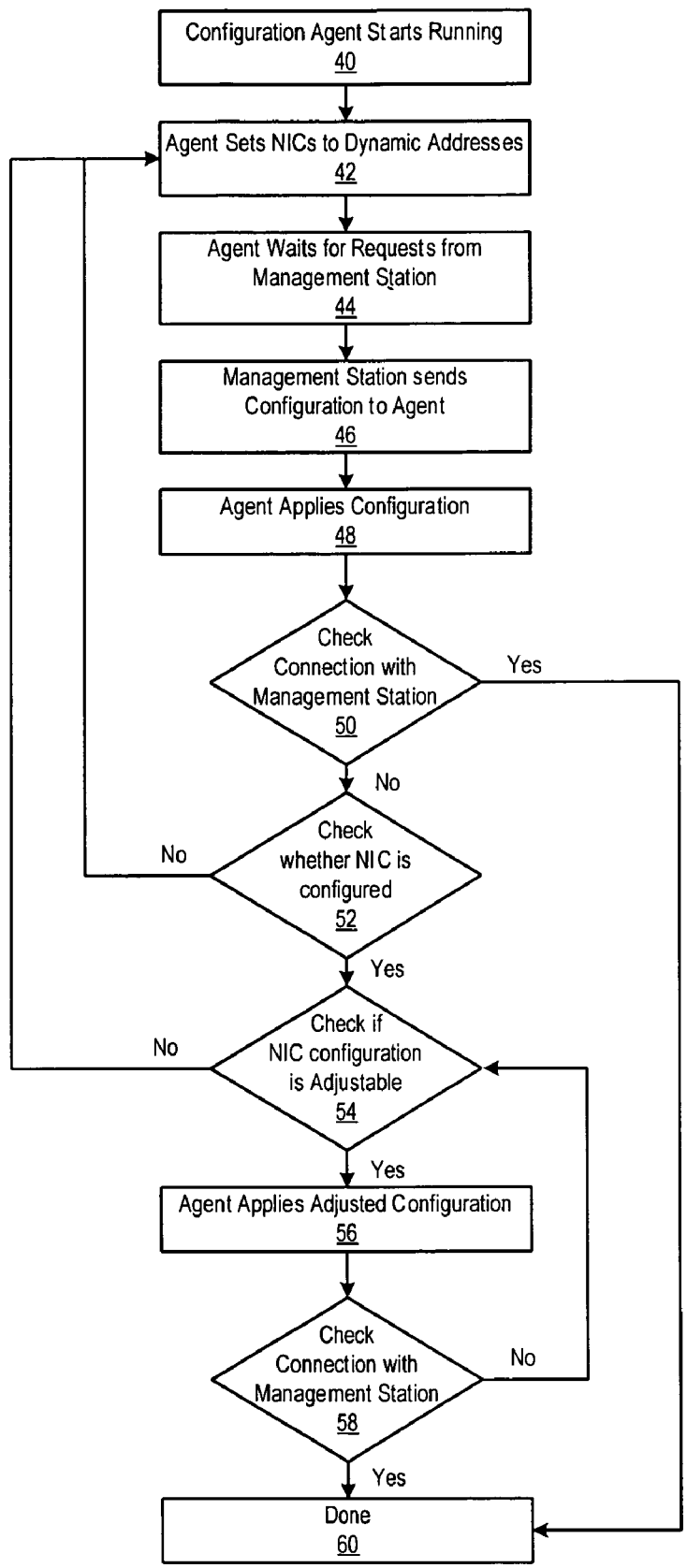
FIG. 2 depicts a process for maintaining network connectivity during remote configuration of network communication components.

Referring now to FIG. 2, a process is depicted for maintaining network connectivity during remote configuration of network communication components. The process begins at step 40 with execution of the configuration agent. At step 42, the configuration agent sets the NICs to a dynamic address, such as with DHCP or AutoIP. Once the dynamic address network communication is operating, at step 44 the configuration agent waits for requests to configure from the remote deployment management station. At step 46, the management station sends configuration information to the configuration agent which, at step 48, applies the configuration information to the NICs, such as the IP addresses that support a static address. At step 50 a communication attempt is made over the network to the management station using the configured NIC to support a static address. If the communication attempt is successful, the process completes at step 60.

If the communication attempt at step 50 fails, a determination is made of how to adjust the configuration to re-establish network communication without having a physical visit by a technician. At step 52, a determination is made of whether the NIC has configuration information, such as the IP address. If the determination is no, the NIC did not receive the proper information at configuration and the process returns to step 42 for another request for configuration information sent by a dynamic address. If the result at step 52 is yes, the process continues to step 54 to determine if the NIC configuration is adjustable. For instance, if only one set of NIC configuration information is found, the configuration is determined as not adjustable and the process returns to step 42 for a re-configuration request. If the NIC configuration is adjustable, the process continues to step 56 to apply the adjusted configuration such as by renumbering the NIC order in the operating system or applying another IP address to the active NIC. At step 58, communication with the management station is attempted and, if successful, the process completes at step 60. If communication with the management station fails, the process returns to step 54 until all IP addresses have been attempted for the active NIC, after which the process returns to step 42 to request a reconfiguration.

Although the present invention has been described in detail, it should be understood that various changes, substitutions and alterations can be made hereto without departing from the spirit and scope of the invention as defined by the appended claims.

What is claimed is:

1. A system for remote configuration of an information handling system, the system comprising:
    a remote deployment management station operable to deploy configurations to plural information handling systems;
    an information handling system interfaced with the remote deployment management station by one of plural network communication components, the plural network communication components operating in an unconfigured state;
    a configuration agent running on the information handling system and operable to configure the network communication components;
    a management connection engine running on the information handling system and operable to determine if a network communication component connects with the remote deployment management station after configuration by the configuration agent; and
    a configuration adjustment engine running on the information handling system and interfaced with the management connection engine, the configuration adjustment engine operable to adjust the configuration of the network communication component to communicate with a dynamic address to send a re-configuration request to the remote deployment management station if the management connection engine determines the network communication component fails to connect with the remote deployment management station after configuration by the configuration agent.

2. The system of claim 1 wherein the configuration adjustment engine is further operable to adjust the configuration by applying configuration information of each of the plural network communication components to the one network communication component to determine if the one network communication component establishes communication with the configuration information of another of the plural network communication components.

3. The system of claim 2 wherein the configuration adjustment engine is further operable to adjust the configuration by setting the network communications component to communicate with a dynamic Internet address if the network communication component is unable to establish communication with the remote deployment management station by application of the configuration information of the plural network communication components.

4. The system of claim 3 wherein the configuration agent is further operable to send a message by the dynamic Internet address to the remote deployment management station that a configuration error has occurred.

5. The system of claim 4 further comprising a management station user interface in communication with the remote deployment management station and operable to communicate new configuration information to the configuration agent at the dynamic Internet address.

6. The system of claim 3 wherein the network communication components comprise network interface cards.

7. The system of claim 6 wherein the configuration information comprises static IP addresses for the network interface cards.

8. A method for remote configuration through a network of an information handling system, the method comprising:
    retrieving network configuration information through a network communication component of the information handling system using a dynamic address;
    applying the network configuration information to the network communication component;
    attempting network communication with the network communication component using a static address determined from the network configuration information;
    determining that the attempted network communication failed;
    automatically adjusting the network communication component configuration at the information handling system; and
    communicating with the network through the adjusted configuration of the network communication component.

9. The method of claim 8 wherein automatically adjusting further comprises:
    adjusting the network communication component to communicate with a dynamic address.

10. The method of claim 9 wherein communicating with the network through the adjusted configuration further comprises:
    sending a report that the network configuration information is erroneous; and
    receiving new network configuration information.

11. The method of claim 10 wherein the network communication component comprises a NIC and the configuration information comprises a static IP address of the NIC.

12. The method of claim 9 wherein automatically adjusting further comprises:
    determining the configuration information of a second network communication component of the information handling system; and
    applying the configuration information of the second network communication component to the first network communication component.

13. The method of claim 12 wherein automatically adjusting further comprises:
    determining failure of an attempt to communicate by the first network communication component with the configuration information of the second network communication component; and
    adjusting the first network communication component to communicate with a dynamic address.

14. The method of claim 13 wherein the network communication components comprise NICs and the configuration information comprises IP addresses.

15. The method of claim 14 further comprising:
    sending new IP addresses for the NICs to the dynamic address; and
    configuring the NICs with the new IP addresses.

16. An information handling system comprising:
    plural network interface cards, each operable to communicate with a dynamic or with a static address when configured with a correct IP address;
    a configuration agent operable to apply configuration information to the network interface cards;

a management connection engine operable to determine whether the network communication components are able to communicate over a network; and a configuration adjustment engine interfaced with the management connection engine and operable to adjust the configuration of the network interface cards that are unable to communicate over the network after application of the configuration information by the configuration agent, wherein the configuration adjustment engine applies the IP addresses of each NIC to a selected NIC to attempt to communicate over the network and commands a selected NIC to communicate with a dynamic address if communication fails with each of the IP addresses.

* * * * *